United States Patent [19]
Yin

[11] Patent Number: 5,864,539
[45] Date of Patent: *Jan. 26, 1999

[54] METHOD AND APPARATUS FOR A RATE-BASED CONGESTION CONTROL IN A SHARED MEMORY SWITCH

[75] Inventor: Nanying Yin, Newton, Mass.

[73] Assignee: Bay Networks, Inc., Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 643,540

[22] Filed: May 6, 1996

[51] Int. Cl.$^6$ .................................. H04J 1/16; H04J 3/14
[52] U.S. Cl. ............................................................. 370/236
[58] Field of Search ...................... 370/229, 230, 370/235, 236, 252, 412, 413, 418

[56] References Cited

U.S. PATENT DOCUMENTS

| | | | |
|---|---|---|---|
| 4,769,811 | 9/1988 | Eckerg, Jr. et al. . | |
| 5,313,454 | 5/1994 | Bustini et al. . | |
| 5,426,640 | 6/1995 | Hluchyj et al. . | |
| 5,493,566 | 2/1996 | Ljungberg et al. | 370/235 |
| 5,541,912 | 7/1996 | Choudhury et al. | 370/412 |
| 5,555,264 | 9/1996 | Sallberg et al. | 370/414 |
| 5,555,265 | 9/1996 | Kakuma et al. | 370/412 |
| 5,583,861 | 12/1996 | Holden | 370/412 |

OTHER PUBLICATIONS

Choudhury, Abhijit et al., "Space Priority Management in a Shared Memory ATM Switch," At&T Bell Laboratories, *IEEE*, Dec. 1993, pp. 1375–1383.
Cicso Press Release, Nov. 29, 1995, 40 pages.
Competitive Alert, "Cisco Readies LightStream 2080," Competitive Marketing, Bay Networks, Inc., Dec. 27, 1995, 1 page.
Competitive Alert, "Cisco/LIghtStream Gets Small," Competitive Marketing, Bay Networks, Inc., Nov. 21, 1995, 1 page.
"Cisco Flicks Switch Up to 10G BIT/SEC," Information Resources, Bay Networks, Source: Network World via First! by Individual, Inc., Dec. 19, 1995, 2 pages.
"Cisco Lightstream 1010 next–generation workgroup/campus ATM switch first to offer standard ATM routine and traffic Management," Information Resources, Bay Networks, Inc., Nov. 27, 1995, 3 pages.
"Traffic Management Specification v4.0; af –tm –0056.000 Letter Ballot," *The ATM Forum Technical Committee,* Apr. 1996, pp. iii–vii; pp. 1–116.

*Primary Examiner*—Ajit Patel
*Attorney, Agent, or Firm*—Blakely, Sokoloff, Taylor & Zafman LLP

[57] ABSTRACT

To determine congestion within a shared memory switch, the global memory usage and the individual address queue memory usage of the switching fabric for the switch are measured. These two types of memory usage are combined to determine a net congestion state for a switching fabric. A similar congestion determination is made for line cards coupled to the main switching fabric. Specifically, the global memory usage within the line card is combined with the individual queue memory usage within the card to generate a line card congestion state. The switching fabric congestion state is then combined with the line card congestion state to determine a net congestion state. Using the net congestion state, an explicit rate can be determined for adjusting ER, CI & NI fields in the RM cell. Two methods of determining an explicit rate are disclosed. The first method modifies the explicit rate found within RM cells. The second method generates an internal "switch explicit rate" using the Current Cell Rate value within forward RM cells. Then, when a backward RM cell is received, the internal switch explicit rate is used as a benchmark to modify the explicit rate field of the RM cell.

9 Claims, 10 Drawing Sheets

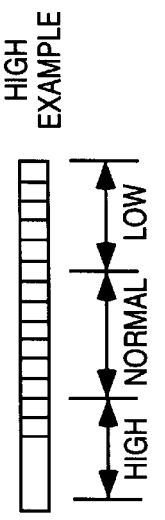
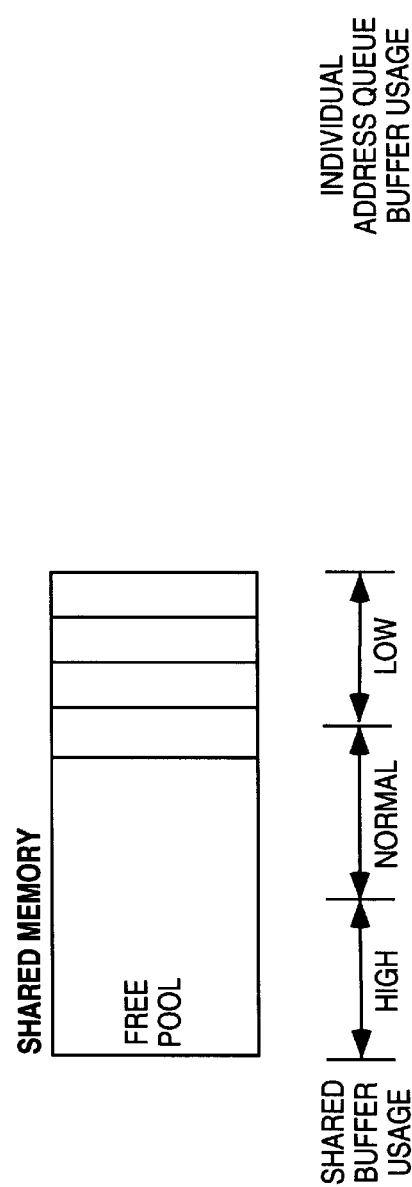
FIG. 4b
FIG. 4a

| INDIVIDUAL ADDRESS QUEUE USAGE / GLOBAL BUFFER USAGE | LOW | NORMAL | HIGH |
|---|---|---|---|
| LOW | LOW | NORMAL | HIGH |
| NORMAL | LOW | LOW | NORMAL |
| HIGH | LOW | NORMAL | MODERATE |
| MODERATE | MODERATE | SEVERE | SEVERE |

DEGREE OF CONGESTION

FIG. 5

| SWITCHING FABRIC CONGESTION \ LINE CARD CONGESTION | LOW | NORMAL | MODERATE | SEVERE |
|---|---|---|---|---|
| LOW | LOW | LOW | MODERATE | SEVERE |
| NORMAL | LOW | NORMAL | MODERATE | SEVERE |
| MODERATE | NORMAL | NORMAL | MODERATE | SEVERE |
| SEVERE | MODERATE | MODERATE | MODERATE | SEVERE |
| SEVERE | SEVERE | SEVERE | SEVERE | SEVERE |

FIG. 6

| CONGESTION DETERMINATION | EXPLICIT RATE DETERMINATION | CI & NI FLAGS | |
|---|---|---|---|
| LOW | DO NOT CHANGE ER | CI = X | NI = X |
| NORMAL | DO NOT CHANGE ER | CI = X | NI = 1 |
| MODERATE | DO NOT CHANGE ER | CI = 1 | NI = X |
| SEVERE | ER = ER * D | CI - 1 | NI = X |

WHERE 1 = SET THE FLAG AND
X = DO NOT CHANGE THE FLAG.

FIG. 7

| CONGESTION STATE | ER_SWITCH ADJUSTMENT |
|---|---|
| LOW | IF (CCR > ER_SWITCH) THEN ER_SWITCH = ER_SWITCH + AV * (CCR - ER_SWITCH) |
| NORMAL | ER_SWITCH = ER_SWITCH + AV* (CCR - ER_SWITCH) |
| MODERATE OR SEVERE | IF (CCR<ER_SWITCH) THEN ER_SWITCH = ER_SWITCH + AV* (CCR - ER_SWITCH) |

FIG. 8

| CONGESTION DETERMINATION | EXPLICIT RATE DETERMINATION | CI & NI FLAGS | |
|---|---|---|---|
| LOW | ER = MIN (ER, ER_SWITCH + RI) | CI = X | NI = X |
| NORMAL | ER = MIN (ER, ER_SWITCH) | CI = X | NI = 1 |
| MODERATE | ER = MIN (ER, $D_m$ * ER_SWITCH) | CI = 1 | NI = X |
| SEVERE | ER = MIN (ER, $D_s$ * ER_SWITCH) | CI = 1 | NI = X |

WHERE 1 = SET THE FLAG AND
X = DO NOT CHANGE THE FLAG.

FIG. 9

METHOD AND APPARATUS FOR A RATE-BASED CONGESTION CONTROL IN A SHARED MEMORY SWITCH

FIELD OF THE INVENTION

The present invention is in the field of computer networking. Specifically, the present invention introduces the method of determining congestion state within a shared memory ATM Switch and performing explicit rate determination for resource management and congestion control.

BACKGROUND OF THE INVENTION

Asynchronous Transfer Mode (ATM) is a new telecommunication standard for a broadband Integrated Service Digital Network (ISDN). ATM has been designed from the ground up to be a telecommunication standard for carrying voice, video and data information. ATM carries information in fixed length cells. Each cell is 53 bytes long where the first five bytes are header information and the remaining 48 bytes are the data payload.

ATM Networks are build by connecting several ATM Switches together with high speed communication lines. Currently, most ATM Switches are coupled together using SONET communication lines as a physical connection layer. To establish a connection in an ATM Network a virtual circuit (VC) is opened up between a source node and a destination node. The source node originates at ATM end point that is coupled to an ATM Switch through a User-Network Interface (UNI). The virtual circuit consists of a series of connections between different ATM Switches in the Network until it terminates an ATM endpoint where the destination user equipment is connected.

For example in FIG. 1, a first piece of user equipment 115 that will act as a source system is connected to an ATM End Point 110. ATM End Point 110 may be an ATM router interface, an adapter card of a workstation or other ATM edge device. The ATM End Point 110 will act as a source for the virtual connection. The ATM End Point 110 connects to an ATM Switch in an ATM network through a UNI interface. The ATM End Point 110 builds a virtual connection to a destination by creating a path with a set of internodal links between various intermediary ATM Switches (151, 152, and 153) that make up an ATM Network 150. The virtual connection ends at a destination ATM End Point 120. The destination ATM End Point 120 is coupled to the destination user equipment 125. Once a virtual connection is established, every cell associated with the virtual connection traverses the exact same route to the destination ATM End Point 120.

When there is a large amount of traffic on an ATM network, then congestion might develop in the ATM Network such that network performance is degraded. During periods of significant network congestion, ATM cells maybe discarded to help alleviate the congestion. Thus, it would be desirable to prevent significant network congestion from occurring by regulating the entrance of new cells into the ATM network. In this manner, ATM cells will not be discarded.

Information about the state of an ATM network, such as the state of congestion and bandwidth availability is conveyed through a virtual connection using special control cells known as Resource Management cells (RM cells). Resource Management cells originate at a source end system (such as The ATM end point 110). The Resource Management cells carry requested maximum cell rate information such as the Peak Cell Rate (PCR) for the virtual circuit in an Explicit Rate (ER) field in the RM cell. The explicit rate defines an upper ceiling on the amount of bandwidth the particular virtual circuit will be allowed to use. As the RM cell travels along the network, each ATM switch adjusts the ER field in the RM cell according the ATM switch's congestion state and explicit rate determination. At the destination ATM end system (ATM end point 120), the RM cell is turned around back to the source ATM end point for rate adjustment. The source ATM end point (ATM End Point 110) adjusts its rate according to the information conveyed in the Backward RM cell. Detailed information about how source and destination systems react to ATM traffic information can be found in the "ATM Forum Traffic Management Specification", Version 4.0, March 1996. However, the methods of determining congestion within each switch, determining the available bandwidth, and explicit rate computation are not subject to standardization.

A shared memory switch is a type of ATM Switch wherein a single block of memory is shared among multiple switch points and queues. With a shared memory switch, each individual queue or port may use a large portion of the shared memory buffer if each individual queue or port is lightly loaded or only a few queues or ports are active. However, when all queues or ports are active and heavily loaded, the available memory becomes significantly low. Under such an overloaded condition, the shared memory switch should request the ATM end points (or rate control point) of the connections using the overloaded port to reduce the cell rate and thereby alleviate the ATM switch's internal congestion. This information is conveyed by the Resource Management cells to the ATM endpoints.

SUMMARY OF THE INVENTION

Is therefore an object of the present invention to determine the congestion state of a shared memory switch.

It is a further object of the present invention to make an explicit rate determination for the virtual circuits associated with that particular ATM Switch.

This and other objectives are accomplished by the method and apparatus of the present invention for determining a shared memory switch congestion state and allowed rate allowed for each connection. In a shared memory switch, the main resource is the memory used to store data cells. When the available memory becomes low, then the shared memory switch is determined to be congested. When the available memory becomes critically low, then the contested switch will begin dropping cells. To prevent this situation, flow control is employed with the used of resource management cells. (RM cells).

To determine congestion in a shared memory switch, the present invention introduces a method of measuring the global memory usage and the memory usage of individual address queues. These two types of memory usage are combined to determine a net congestion state for a switching fabric. A similar congestion determination is made for line cards coupled to the main switching fabric. Specifically, the global memory usage within the line card is combined with the individual queue memory usage within the card to generate a line card congestion state. The switching fabric congestion state is then combined with the line card congestion state to determine a net congestion state.

Using the net congestion state, an explicit rate can be determined for adjusting ER, CI & NI fields in the RM cell. Two methods of determining an explicit rate are disclosed. The first method modifies the explicit rate found within RM cells. The second method generates an internal "switch explicit rate" using the Current Cell Rate value within forward RM cells. Then, when a backward RM cell is received, the internal switch explicit rate is used to modify the explicit rate field of the RM cell.

BRIEF DESCRIPTION OF THE DRAWINGS

FIGS. 4A and 4B illustrate a conceptual diagram that describes how the congestion state is determined depending on the memory usage of the shared memory and memory usage of the individual queues.

FIG. 5 is a chart that describes how the memory usage of the shared memory and the individual queues is combined to determine the degree of congestion of the shared memory switch.

FIG. 6 is a chart that describes how the congestion state in a line card and the congestion state in the main switching fabric is combined to determine a system congestion state.

FIG. 7 is a chart that describes a simple method of how the congestion state is used to modify the explicit rate field of a backward RM cell.

FIG. 8 is a chart that describes how the congestion state is used to determine an internal switch explicit rate.

FIG. 9 is a chart that describes how the congestion state and internal switch explicit rate are used to determine an explicit rate to be placed into backward resource management cells.

DETAILED DESCRIPTION OF THE PREFERRED EMBODIMENT

A method and apparatus for determining the congestion state in a share memory switch is disclosed. The method of the present invention can also make explicit rate determinations based upon the congestion state determination. In the following description, for purposes of explanation, specific nomenclature is set forth to provide a thorough understanding of the present invention. However, it will be apparent to one skilled in the art that these specific details are not required in order to practice the present invention.

ATM Traffic Congestion

Figure 1:
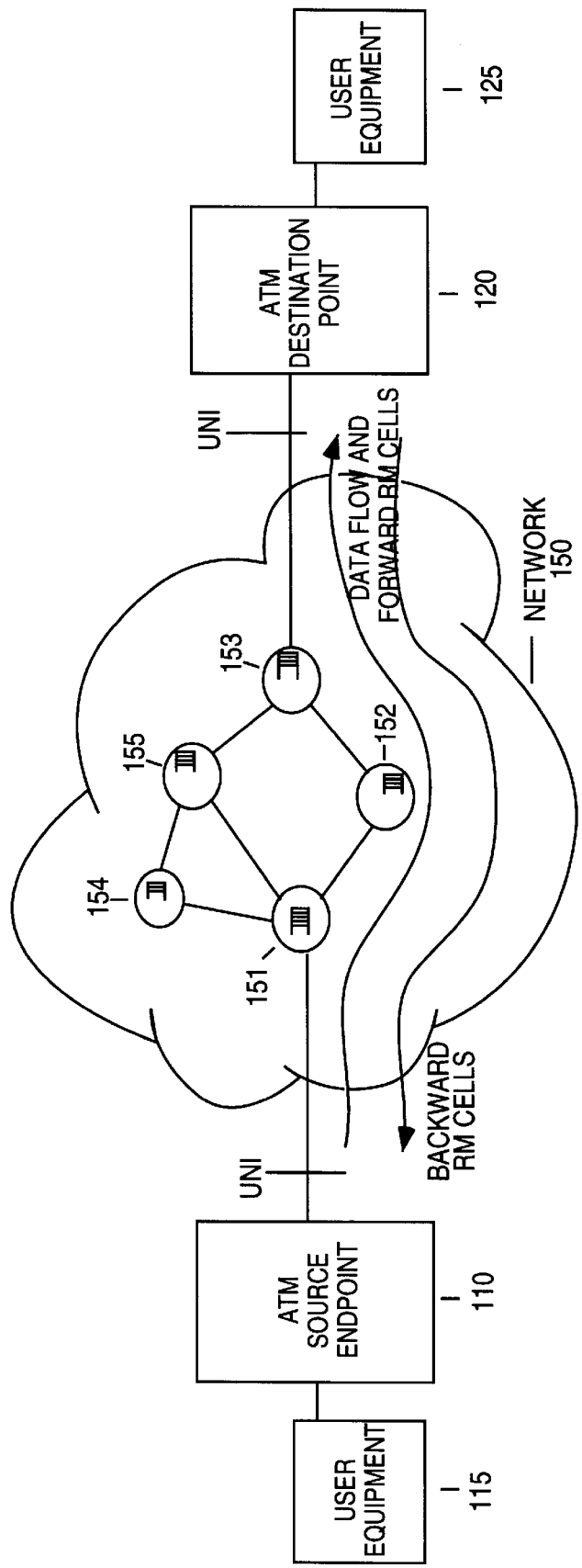
FIG. 1 illustrates a virtual circuit from one end-user computer system to another end-user computer system across a ATM Network.

FIG. 1 illustrates two end-user computer systems connected through an Asynchronous Transfer Mode (ATM) Network. At each end of the connection there is an ATM endpoint that has a User-Network Interface (UNI) that couples the ATM Network. Between the two ATM endpoint there are several other intermediary ATM Switches that form an ATM network.

To establish a connection between the two end-user computer systems, a virtual circuit is routed through the ATM network. The virtual circuit consists of a path between the ATM endpoint the intermediary switches of the ATM network.

Along the virtual circuit that connects the two endpoints, the ATM Switches may suffer from network congestion. Network congestion develops when more cells enter the network than the available bandwidth can handle. When network congestion becomes severe then ATM cells traveling along virtual circuits may be discarded. Obviously, this is a situation that would be best to avoid. To prevent ATM cells from being discarded, it is best to prevent severe network congestion from ever developing.

To prevent network congestion from occurring, flow control methods are employed. Flow control limits the amount of information entering the network and thus prevents network congestion. One method that ATM technology uses to employ flow control is to pass Resource Management (RM) cells through the virtual circuits in the ATM network. Forward and backward RM cells travel along each virtual circuit as illustrated in FIG. 1. The RM cells inform the various intermediary ATM switches about rate status of each connection and inform ATM endpoint about the network congestion and available bandwidth. Each ATM Switch along the virtual circuit is responsible for updating RM cell's various fields that describes it's own congestion situation.

A Shared Memory ATM Switch

Figure 2:
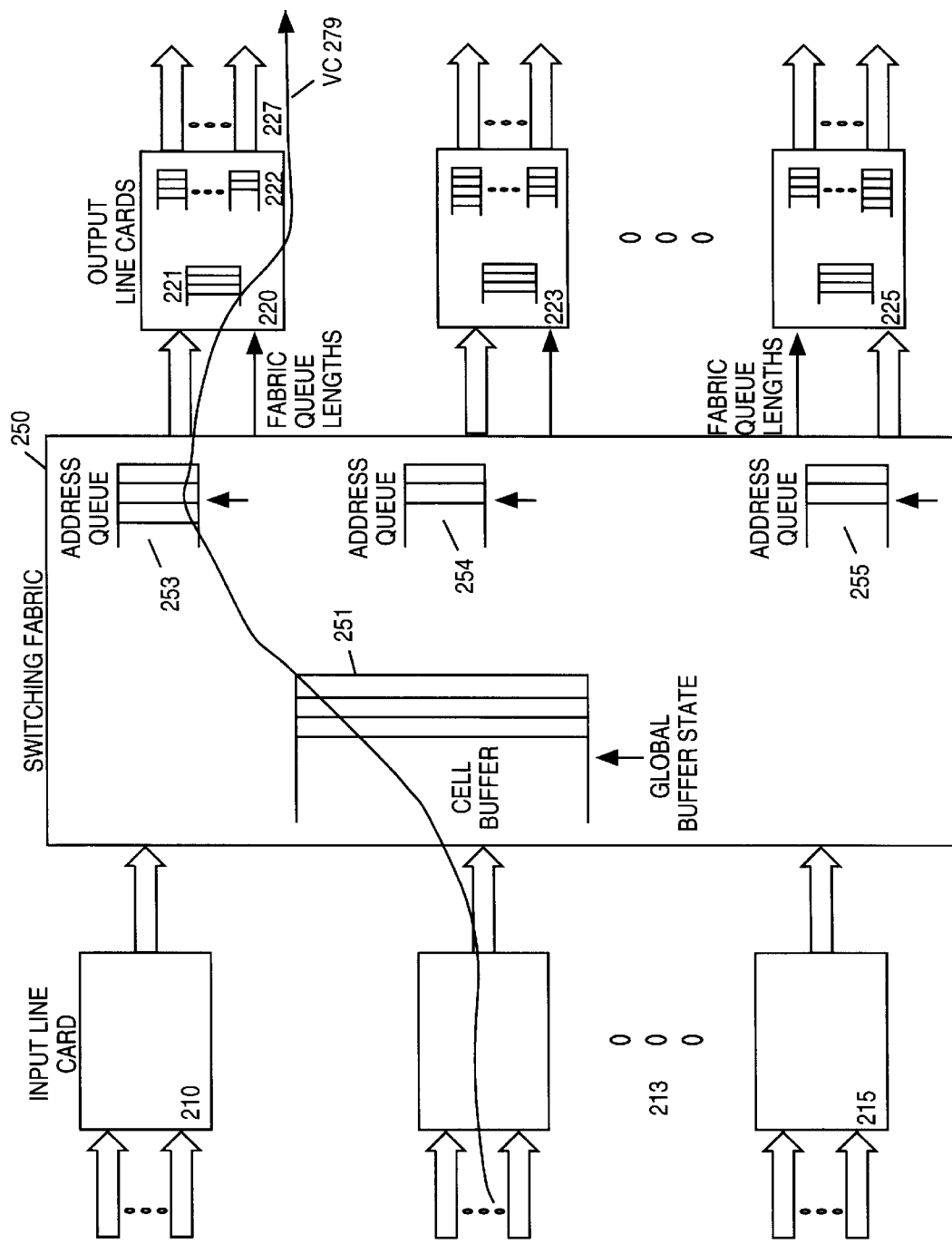
FIG. 2 illustrates a block diagram of a shared memory ATM switch.

FIG. 2 illustrates an embodiment of a shared memory ATM Switch. In the shared memory ATM Switch of FIG. 2 there are plurality of input line cards 210, 213, 215 for accepting incoming data. The input line cards 210, 213, 215 handle the interface between the ATM Switch and the incoming digital communication lines. There are also plurality of output line cards 220, 223, 225 that handle the interface for outgoing data. Each line card has a plurality of physical interfaces for communication lines. Though illustrated separately in FIG. 2 for clarity, in practice both input and output are handled by the same line cards.

The input line cards 210, 213, 215 and output line cards 220, 223, 225 are coupled to a main switching fabric 250. The shared memory ATM Switch, the switching fabric comprises in part a large shared memory area. The large shared memory is used for cell buffer queue 251 that accepts incoming cells from the various input ports. An address is assigned to each incoming cell indicating the location of the cell in the shared memory and the address is stored in one of the outgoing address queues at the destined output port. Each port may have multiple address queues with at least one queue for Available Bit Rate (ABR) cells. When the output port is ready to transmit a cell, it selects one of the addresses from one of the port's associated address queues and reads the cell from the shared memory. The cell is then sent through the port to the line card. This same store and forward method occurs within each outgoing line card, where a shared memory is used for multiple output physical ports.

When congestion occurs in the ATM Switch of FIG. 2, the amount of memory available to the different queues becomes lower. When such congestion occurs the ATM Switch should warn the ATM endpoint about the congestion situation using a resource management cell.

Congestion Determination in a Shared Memory ATM Switch

To determine the congestion state for a particular virtual circuit carried by the shared memory ATM Switch, the present invention determines both the congestion state within the main switching fabric 250 and the congestion state within the outgoing line card that carries the virtual circuit. Once the main switching fabric congestion state and the line card congestion state have been determined, a net congestion state is determined by combining the main switching fabric congestion and the line card congestion. After determining the net congestion state, the net congestion state can be used to update the explicit rate of the virtual circuit that is carried by a resource management cell.

Figure 3:
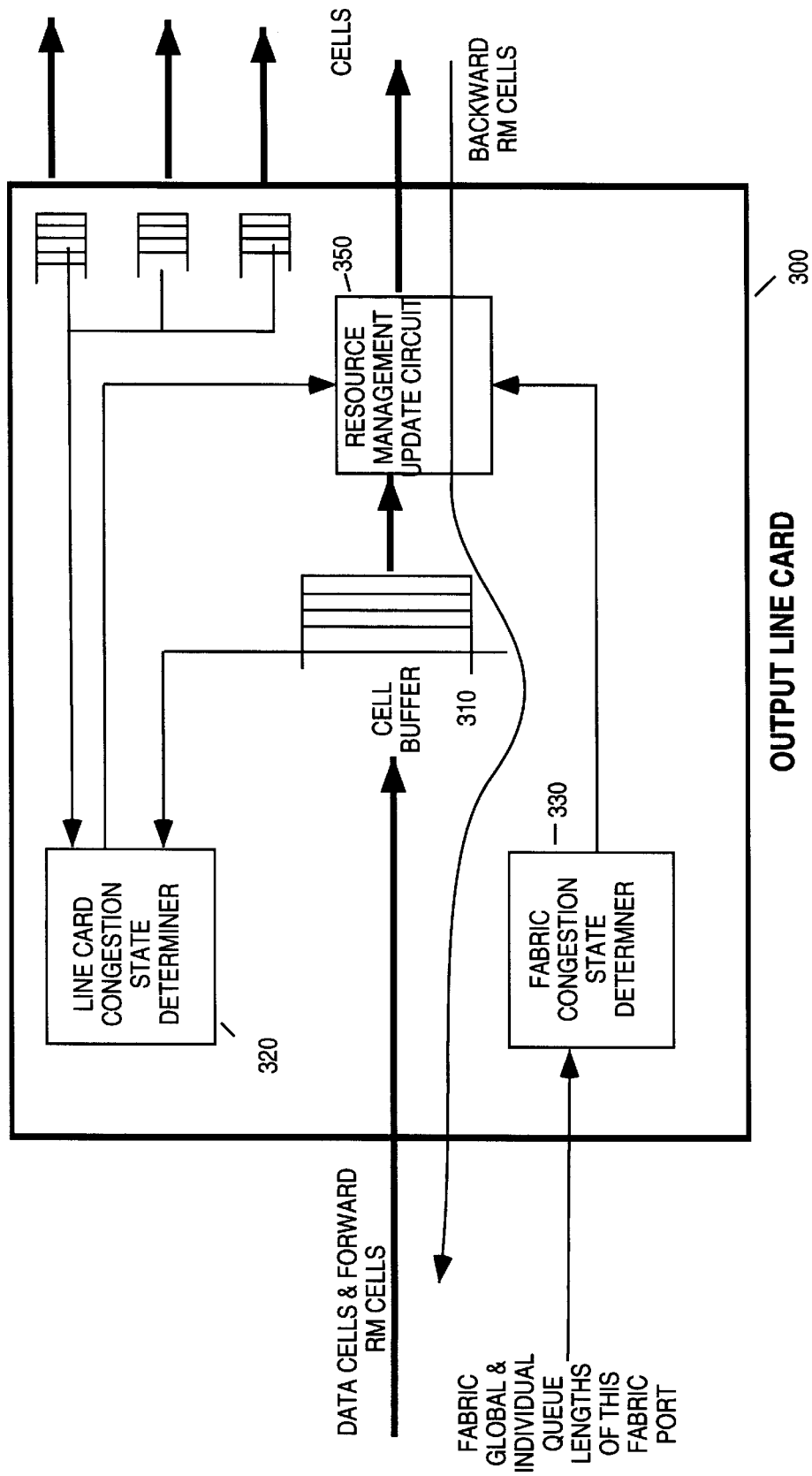
FIG. 3 illustrates a block diagram of an output line card from the shared memory ATM switch of FIG. 2.

The various congestion states are determined within the output line cards. FIG. 3 illustrates a block diagram of an output line card 300 such as the output line card 220 of FIG. 2. In the output line card 300 of FIG. 3 a fabric congestion state determiner 330 receives information about the global shared memory usage and the individual address queue usage in the main switching fabric to determine a main switching fabric congestion state. Alternatively, the congestion in the main switching fabric 250 could be determined within the main switching fabric 250 and then given to the output line card. The amount of congestion within the output line card 300 is determined by line card congestion state determiner 320. The switching fabric congestion state and the line card congestion state are combined by the resource management update circuit 350 to determine a net congestion state.

Resource Management cells (RM cells) are associated with each individual virtual connection (VC). The net congestion state for a particular virtual connection is determined by examining the congestion state of the fabric port/queue and the congestion state of the line card physical port/queue over the path of the virtual connection. For example, in FIG. 2, a virtual connection 279 comes from input line card 213 and goes through fabric port/queue 253 of the switching fabric 250 to the line card 220 physical port 222. The net congestion state for this connection is the combination of congestion states of fabric port/queue 253 and line card port/queue 222.

FIGS. 4a, and 4b, are conceptual diagrams that explain how the fabric congestion state determiner 330 and line card congestion state determiner 320 determine a congestion state for the main switching fabric and line card. In FIG. 4a, a rectangle is used to represent the total amount of free memory available in the shared memory pool. As memory is allocated, the allocated memory is used from the right side of rectangle in FIG. 4a. The lines on the right side the shared memory pool indicate used memory. As more and more memory is being used the lines built towards the left. Three different memory usage zones illustrated below the shared memory pool quantify the global shared memory usage. When the amount of memory usage is near the right, it is low memory usage. As the amount of memory use builds near the center of the shared memory pool then it is consider normal memory usage. When the used memory usage reaches the left side of the shared memory pool, then high memory usage is indicated. Referring to FIG. 2, the global memory usage of the memory switching fabric 250 is transmitted to all the output line cards 220, 223, and 225. The global memory usage (i.e., the Global buffer queue length) is updated to the line card periodically at a fixed interval.

Similarly, memory usage is also determined for the all the individual address queues. FIG. 4b illustrates three conceptual diagram s of memory usage for individual address queues. Again, memory usage pattern of low, normal, or high is determined for each address queue. The memory usage is monitored by using a sampled queue length or an average queue length. FIG. 4b only shows three address queues for simple illustration. However, each physical port has at least one Available Bit Rate (ABR) address queue for all ABR virtual connections. Alternatively, each port may have an address queue for each virtual connection that uses the port. The address queue length information is provided to the associated line card periodically at a fixed interval.

Referring to FIG. 3, the fabric congestion state determiner 330 combines the amount of global shared memory usage in the switching fabric 250 and an individual address queue memory usage in the switching fabric to determine a congestion state for the shared memory switching fabric as associated with the address queue. FIG. 5 illustrates how the two different types of memory usage are combined to determine an overall degree of congestion for the address queue. Specifically, the amount of global shared memory usage is used to select a particular row of FIG. 5 and the amount of individual address queue memory usage is used to select a column of FIG. 5. The row and column combination select an overall congestion state for the memory switching fabric as associated with the address queue.

An example of determining a congestion state is hereby provided with reference to address queue 253 in FIG. 2. First, the global shared memory 251 usage and address queue 253 usage are read. Then, the congestion state of address queue 253 is determined using the table illustrated in FIG. 5. For example, if the address queue 253 usage is "Low", and Global memory usage is "High", then the congestion state of the address queue 253 is "Moderate" from the table look up of FIG. 5.

The table of FIG. 5 may be configured differently for different systems. For example, to be more aggressive, the cross point of the "high" global usage and the individual "normal" usage may be set to "Moderate" instead of "Severe".

Referring back to FIG. 3, the line card congestion state determiner 320 makes a similar congestion state determination for the output line card. Specifically, the line card congestion state determiner 320 determines a global shared memory usage for the line card and an individual address queue memory usage for the line card. Then the line card congestion state determiner 320 combines the global shared memory usage and the individual address queue memory usage to determine an output line card congestion state using the chart of FIG. 5.

Referring again to FIG. 3, the resource management update circuit 350 receives the line card congestion state from line card congestion state determiner 320 and receives the switching fabric congestion state from the fabric congestion state determiner 330. The resource management update circuit 350 combines the line card congestion state and the switching fabric congestion state using the chart in FIG. 6 to determine a net congestion state. To summarize FIG. 6, the resource management update circuit 350 uses the worse congestion between the switching fabric congestion state and line card congestion state. For example, if the line card congestion state is "Normal" and fabric congestion state is "Moderate", then the net congestion state is then "Moderate".

Explicit Rate Determination

Using the net congestion state, the resource management update circuit 350 determines what is the appropriate rate (i.e., allowed cell sending rate from each source) for each virtual connection (VC). As stated earlier, this rate information is conveyed by Resource Management Cells (RM cells) back to the source end point. Based on the information in RM cells, the ATM end point adjusts its cell generating rate accordingly.

Each resource management cell (RM cell) that travels through a virtual circuit contains the following fields:

DIR The direction of the RM cell. 0=forward and 1=backward.

NI No Increase indication. If NI=1 then the source system must not increase the cell rate above the current level.

CI Congestion Indication. If CI=1 then the source system must reduce the cell rate.

ER Explicit (Cell) Rate. The source system sets the Explicit Rate to the maximum Peak Cell Rate. Each intermediary switch sets the Explicit Rate to a lower rate if the intermediary switch cannot handle the existing Explicit Rate.

CCR Current Cell Rate. The source system sets the Current Cell Rate field with the current cell rate at the source.

To effectuate a flow control change, each intermediary switch adjusts the ER, CI, and NI fields in the RM cell as appropriate. The No Increase (NI) flag indicates that no increase of the source rate should occur. The Congestion Indication (CI) flag indicates whether there is congestion along the virtual circuit path. When the Congestion Indication flag is set, source system must reduce the cell rate. If any ATM switch along the virtual circuit path has set either the NI flag or the CI flag then the flag should not be reset by any other switch. However, if the current switch decides that one of the flags should be set, then that switch will set the flag. The explicit rate (ER) can be decreased by any switch if the switch is congested. However, the ER field in RM cell can never be increased, since it may have been lowered by other ATM switches along the virtual connection.

The present invention introduces two different methods of adjusting these fields using the congestion state information generated for the shared memory switch.

A Simple Rate Determination system

The first method of making a rate determination is to adjust the value in the Explicit Rate field of any backward RM Cell in response to the current congestion state. FIG. 7 illustrates one embodiment of performing this adjustment. Referring to FIG. 7, if the congestion state is low, then the ER, CI, and NI fields of the backward RM cell are not modified at all.

If the congestion state is normal, then the ER and CI fields of the backward RM cell are not modified. However, the NI field is set to prevent the source rate from being increased.

If the congestion state is moderate, then CI field of the backward RM cell are set to reduce the cell rate. However, the ER field is not modified.

If the congestion state is severe, then the CI field of the backward RM cell is set to reduce the cell rate. The ER field is reduced by a large amount by multiplying it by a decrease factor D. D is chosen to be less than 1, such as ¾. By reducing ER, the upper ceiling of the cell rate is reduced, thus, the congestion will eventually be reduced.

Explicit Rate Determination using the Current Cell Rate

A more sophisticated method of performing explicit rate determination is to use the Current Cell Rate (CCR) field in the forward RM cell. The CCR value in the forward RM cell is used to determine an internal "switch explicit rate" (ER_switch). The internal ER_switch rate is a rate that the switch uses as the benchmark to adjust ER field in Backward RM cells. To initialized the ER_switch value, ER_switch maybe set to zero or set to the value of the CCR field in the first forward RM cell received.

For the CCR based explicit rate determination method, the follow terms are used:

ER_switch The switch explicit rate. The switch explicit rate is computed based on the switch's congestion state and the CCR field in the forward RM cell. The switch explicit rate is used as a benchmark for determining the ER field in the backward RM cell.

AV Averaging factor. The Averaging factor is used to compute the ER_switch value. 0<AV<1.

$D_m$ A reduction rate factor when the congestion rate is moderate. $0<D_m<1$. The $D_m$ value maybe ⅞.

$D_s$ A reduction rate factor when the congestion rate is Severe. $0<D_s<1$. The $D_s$ value maybe ½. $D_s<D_m$ RI Rate Increase. This is an amount to increase the cell rate by if there is no congestion along the virtual circuit in the switch.

FIG. 8 illustrates how the internal ER_switch benchmark value is modified when a forward RM cell is received. As illustrated in FIG. 8, when the congestion is low and the Current Cell Rate is greater than the internal ER_switch cell rate (CCR>ER_switch), then the internal ER_switch cell rate is increased. However, if the congestion is low and the Current Cell Rate is less than the internal ER_switch cell rate, then the internal ER_switch is unchanged.

If the congestion along the virtual circuit is normal, then the internal ER_switch cell rate is modified to bring the internal ER_switch cell rate closer to the Current Cell Rate.

If the congestion is moderate or severe and the Current Cell Rate is less than the internal ER_switch cell rate (CCR<ER_switch), then the internal ER_switch benchmark cell rate is decreased. The decreased ER_switch cell rate will later be used to lower the ER field in the backward RM cell to reduce congestion. However, if the congestion is moderate or severe and the Current Cell Rate is greater than the internal ER_switch cell rate, then the internal ER_switch is unchanged.

FIG. 9 lists how the ER field of the backward RM cell is modified depending on the switch congestion and the internal ER_switch value. If the congestion state is low, then the ER field of the backward RM cell is set to the minimum of the current ER value or the ER_switch value plus a small rate increase of RI.

If the congestion is normal, then the ER value is set to the minimum of the current ER value or the internal ER_switch value. In this manner, the ER field is modified only if the internal ER_switch value dictates that a lower rate is needed.

If the congestion rate is moderate or severe, then the ER should probably be reduced. If the congestion rate is moderate, then the ER value is set to the minimum of the current ER value or the ER_switch value multiplied by a moderate decrease factor ($D_m$). The moderate decrease factor ($D_m$) may be a value such as ⅞ that moderately reduces the cell rate. If the congestion rate is severe, then the ER value is set to the minimum of the current ER value or the ER_switch value multiplied by a severe decrease factor ($D_s$). The severe decrease factor ($D_s$) may be a value such as ½ that severely reduces the cell rate to reduce congestion.

The NI and CI fields are treated the same as the first method of making an explicit rate determination as illustrated in FIG. 9. Specifically, referring to FIG. 9, if the congestion state is low, then the CI and NI fields of the backward RM cell are not modified. If the congestion state is normal, the NI field is set to prevent the source rate from being increased. If the congestion state is moderate or severe, then the CI field of the backward RM cell is set to force a reduction of the cell rate.

Figure 10:
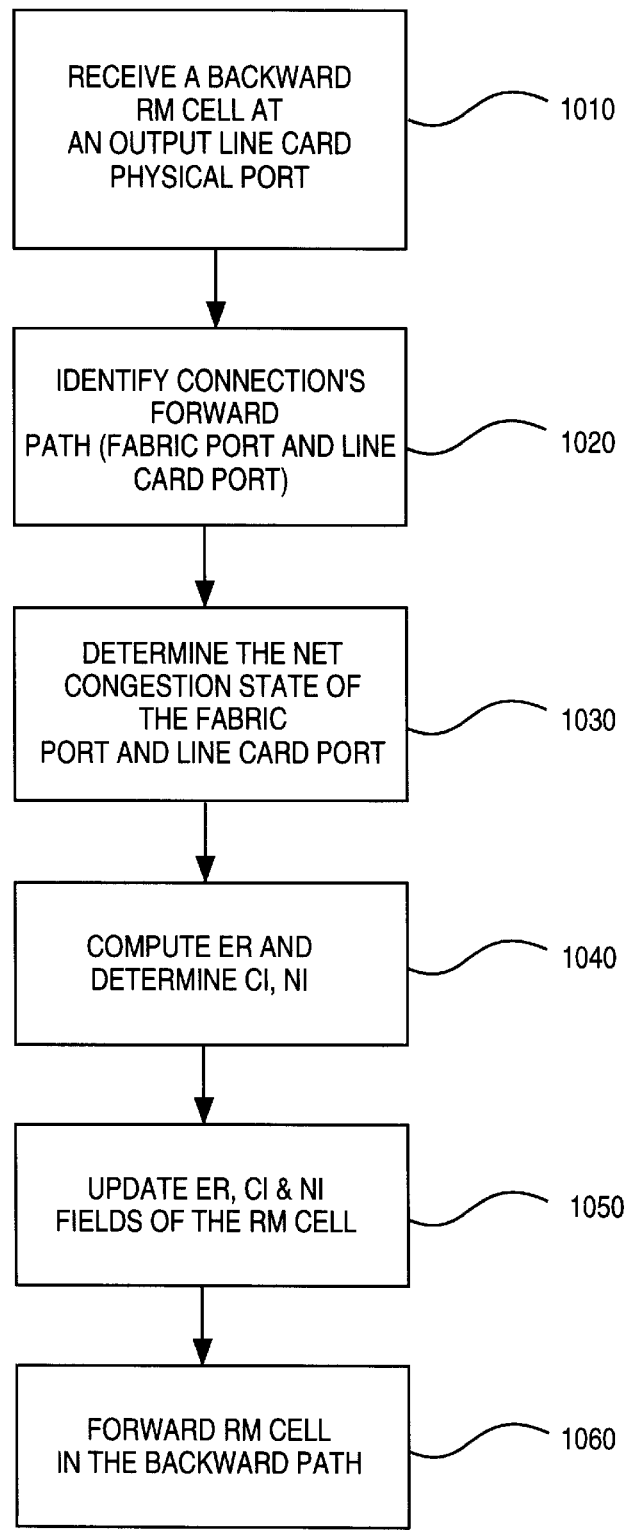
FIG. 10 is a flow diagram that describes how the present invention determines a switch congestion state makes explicit rate determinations.

FIG. 10 illustrates a flow diagram the operation steps of the backward RM cell processing. Referring back to FIG. 1, it can be seen that backward RM cells carry the congestion and network available bandwidth information back to the ATM source endpoint for rate adjustment. Each ATM switch along the path updates ER, and/or CI & NI fields of the backward RM cells for the virtual connection based on the virtual connection's congestion state and bandwidth availability in the forward direction.

Referring to FIG. 10, a backward RM cell is first received on a line card port at step 1010. The Resource Management Update Circuit 350 identifies the forward path for the virtual connection including the fabric port and line card port at step 1020. Next, the net congestion state 1030 of the fabric port and line card port is determined using the table of FIG. 6, based on information provided by Fabric Congestion State Determiner 330 and Line Card Congestion State Determiner 320. Based on the net congestion state, the Resource Management Update Circuit 350 computes ER, and CI & NI fields at step 1040 using the Table of FIG. 7 (if using simple method) or the Table of FIG. 9 (if using complex method). After updating ER, CI & NI fields of the backward RM cell at step 1050, the RM cell is then sent along the backward path at step 1060.

The foregoing has described a method and apparatus for determining congestion in a shared memory switch and making an explicit cell rate determination. It is contemplated that changes and modifications may be made by one of ordinary skill in the art, to the materials and arrangements of elements of the present invention without departing from the scope of the invention.

We claim:

1. In an ATM network system, a method of determining congestion in a shared memory switch, said method comprising the steps of:

determining a switch global memory usage in said shared memory switch;

determining a switch individual queue memory usage in said shared memory switch; and combining said switch global memory usage and said switch individual queue memory usage to generate a switch congestion state for said shared memory switch.

2. The method as claimed in claim 1, said method further comprising the steps of:

determining a line card global memory usage in a line card coupled to said shared memory switch;

determining a line card individual queue memory usage in a line card coupled to said shared memory switch; and combining said line card global memory usage and said line card individual queue memory usage to generate a line card congestion state for said shared memory switch.

3. The method as claimed in claim 2, said method further comprising the steps of:

combining said switch congestion state and said line card congestion state to generate a net congestion state for said shared memory switch.

4. The method as claimed in claim 3 wherein said step of combining comprises selecting the worse congestion state between the switch congestion state and the line card congestion state.

5. The method as claimed in claim 3, said method further comprising the steps of:

determining a first explicit rate based upon said net congestion state and a second explicit rate received in a resource management cell.

6. The method as claimed in claim 3, said method further comprising the steps of:

determining an internal switch explicit rate based upon said net congestion state and a current cell rate received in a forward resource management cell; and modifying explicit rate received in a backward resource management cell based upon said net congestion state and said internal switch explicit rate.

7. A network switching apparatus, said apparatus comprising:

a main switching fabric, said main switching fabric comprising a global shared memory, said global shared memory divided into a global cell buffer; said global cell buffer for storing at least one incoming cell, at least one address queue, said address queue comprising at least one address pointing to an incoming cell in said global cell buffer;

a fabric congestion state determiner, said fabric congestion state determiner determining a switching fabric congestion state for said main switching fabric; and at least one output line card, said output line card coupled to said main switching fabric, said output line card comprising a physical interface to a communication line, a line card congestion state determiner, said line card congestion state determiner determining a line card congestion state for said output line card, and a resource management update circuit, said resource management update circuit determining a net congestion state based upon said switching fabric congestion state and said line card congestion state.

8. The network switching apparatus as claimed in claim 7 wherein said resource management update circuit determines an internal switch explicit rate.

9. The network switching apparatus as claimed in claim 7 wherein said resource management update circuit modifies an explicit rate on a backward resource management cell based upon said internal switch explicit rate and said net congestion state.

* * * * *